# United States Patent [19]

Steffen

[11] 4,053,991
[45] Oct. 18, 1977

[54] AUTOMATIC CONTROL FOR MAINTAINING EQUILIBRIUM TEMPERATURE/MOISTURE BETWEEN STORED GRAIN AND ATMOSPHERE

[76] Inventor: Sylvester L. Steffen, R.R. 3, New Hampton, Iowa 50659

[21] Appl. No.: 676,476

[22] Filed: Apr. 13, 1976

[51] Int. Cl.$^2$ ............................................. F26B 21/12
[52] U.S. Cl. ........................................ 34/54; 34/34; 34/233
[58] Field of Search ...................... 34/233, 54, 13, 34; 98/52, 53, 55; 236/91 A

[56] References Cited
U.S. PATENT DOCUMENTS

| 2,601,028 | 6/1952 | Kersten | 200/139 |
| 2,935,009 | 5/1960 | Cloud et al. | 34/54 |
| 2,968,874 | 1/1961 | Fishburn | 236/91 A |
| 3,426,445 | 2/1969 | Steffen | 34/233 |
| 3,563,460 | 2/1971 | Nine | 98/55 |

Primary Examiner—John J. Camby
Assistant Examiner—Larry I. Schwartz
Attorney, Agent, or Firm—Henderson, Strom & Sturm

[57] ABSTRACT

A method and apparatus for maintaining an equilibrium of temperature and moisture between grain stored in a grain bin and the surrounding atmospheric air. A grain temperature sensor and an air temperature sensor are connected to a comparator circuit which compares the relative temperatures. When a predetermined temperature differential between the grain and the atmospheric air is exceeded, the comparator circuit switches on an activating circuit which, in turn, completes an electrical circuit to the fan motor. When the fan is running, outside air is circulated through the grain to bring the temperature and moisture of the grain and the outside air back into an approximately equilibrium condition, plus or minus an allowable temperature differential. When the temperature differential between the grain and the atmospheric air is reached, the fan motor is turned off. When the temperature of the atmospheric air rises above a predetermined level, a cut-out device will disable the actuating circuit to thereby prevent outside air from being circulated through the grain. Under these conditions, the grain may be held in a cured state for an almost indefinite length of time with no deterioration of the grain.

15 Claims, 2 Drawing Figures

AUTOMATIC CONTROL FOR MAINTAINING EQUILIBRIUM TEMPERATURE/MOISTURE BETWEEN STORED GRAIN AND ATMOSPHERE

BACKGROUND OF THE INVENTION

The present invention relates generally to the control of the storage environment for bulk-stored food grains, and, more particularly to controlling the storage environment in order to maintain the grain temperature and moisture in approximate equilibrium with the atmospheric temperature and moisture.

In the uncured state, i.e., before an equilibirum temperature/moisture condition is achieved, biochemical release of moisture from the seed to the surrounding atmosphere occurs, as does seed respiration which also releases moisture and heat. Recent advances in the grain conditioning art teach the use of constant airflows of specified volumes, according to seed moisture, to remove moisture as rapidly as it is released from the seed in order to effect a stable environment and achieve an equilibrium condition.

The removal of heat from the grain is as important as the removal of moisture, for any increase in grain temperature accelerates internal metabolism and respiration, thus causing a pyramiding accumulation of heat and moisture and an accompanying deterioration of grain. For example, if ½% of the dry weight of grain is consumed by respiration, the amount of heat produced by one bushel of grain is sufficient to raise the temperature of that bushel by approximately 67° F. Multiply this by 10,000 bushels and even 100,000 bushels, since some storage structures hold that much, and it can readily be seen why removal of the heat from the grain is so critical.

The value of ventilation of grain in bringing it to a dry and cured condition is generally understood; but, the importance and the proper way of ventilating cured grain is not understood.

Generally, there are two approaches to controlling ventilation. The most common method is manual activation of fans when the operator decides ventilation is needed. This is unsatisfactory because of the possible error in human judgement. The other most common method is to install a thermostat with a sensor in the grain that responds to heating of the grain, thereby, activating the fan. This method is incorrect since it waits for a problem to develop, i.e., accumulation of heat and moisture, before activating ventilation.

Therefore, there is a need for a simple control for activating and deactivating ventilation equipment, whether the grain is in a cured or an uncured state, in response to the differential temperature condition that exists between the grain and the atmospheric air. As long as an equilibrium condition between the grain and its environment does not exist, the control equipment would preferably automatically respond by activating the ventilation equipment to bring about an equilibrium state (temperature/moisture) between the grain and the atmospheric air surrounding the bin.

Furthermore, as referred to above, grain respiration causes the accumulation of heat and moisture in the interstitial air around stored seeds on a continuing basis. Seed moisture content and seed temperature determine the rate of respiration and thus the rate of accumulation of heat and moisture in the interstitial air. Ventilation should provide constant removal of this heat and moisture. Wind-powered ventilation equipment can, by design, be adequate to provide for some constant removal of respiration heat and respiration-moisture; but, where large volumes of grain are involved or where prevailing winds are insufficient to induce adequate draft, electrically powered ventilation equipment is needed.

Further, for economic reasons it is desirable to prevent excess drying of grain, for the weight of moisture in grain determines bushels and thus income, as does weight of dry matter. Once grain moisture is brought to a 14–15% level, minimal ventilation is required to prevent heating through the summer months. Manual or thermostatic deactivation of a fan during these months is desirable to prevent unnecessary removal of moisture which will take place if automatic ventilation methods are employed.

SUMMARY OF THE INVENTION

This invention relates to a method and apparatus for maintaining an equilibrium condition with respect to temperature and moisture between grain in a grain bin and ambient air. Control equipment is provided for monitoring the ambient air temperature and the grain temperature; and, when the difference between the two is greater than a predetermined amount, ventilation equipment circulates air through the grain until the temperature differential is reduced, at which time the ventilation equipment is turned off.

Basically, the control equipment utilizes thermistors as the temperature sensitive probes, with one thermistor unit positioned within the grain and a second thermistor until being in contact with the air. A comparator is connected to both temperature probes; and, when the temperature differential between the grain and the outside air is exceeded, the comparator energizes an activating circuit which, in turn, switches on the fan motor, thereby circulating the outside air through the grain. When the temperature differential between the grain and the atmospheric air is reduced to the proper level, the comparator turns off the activating circuit, which will, in turn, switch off the fan motor and stop the forced circulation of air through the grain.

In some instances, it is not desirable to maintain the temperature equilibirum when the atmospheric air temperature rises beyond a certain level. Therefore, the control equipment further includes a high temperature cut-out device which disables the activating circuit when the temperature of the atmospheric air rises above a predetermined level.

An object of the present invention is the provision of apparatus for maintaining a temperature-moisture equilibrium between stored grain and ambient atmospheric air.

Another object is to provide apparatus for maintaining a temperature-moisture equilibirum between stored grain and atmospheric air which is accurate and easy to use.

Other objects, advantages, and novel features of the present invention will become apparent from the following detailed description of the invention when considered in conjunction with the accompanying drawings.

DESCRIPTION OF THE PREFERRED EMBODIMENT

Figure 1:
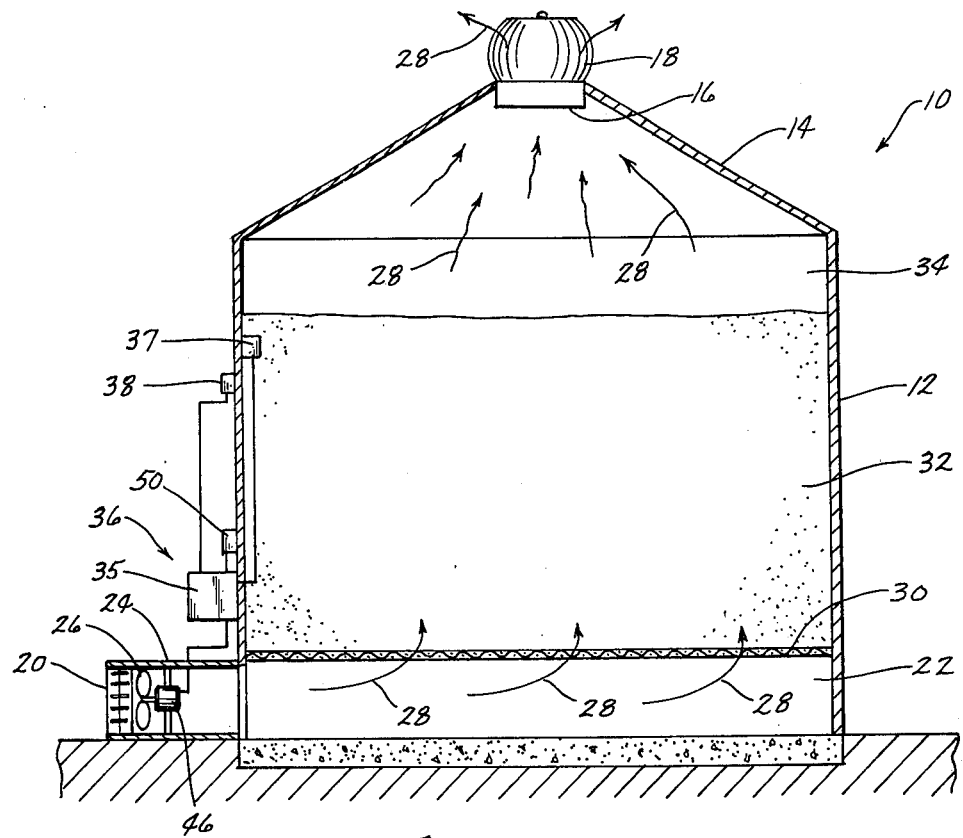
FIG. 1 is a diagram of the apparatus for maintaining a temperature-moisture equilibrium between stored grain and ambient air.

Referring now to the drawings wherein like reference numerals designate identical or corresponding parts throughout the two views, FIG. 1 illustrates a grain storage structure 10 of a type which may be used in practicing the present invention.

The grain storage structure 10 includes a conventional storage bin having air impervious sidewalls 12 and a roof 14. The roof 14 includes an opening 16 in the top and center thereof. A turbine ventilator 18 is disposed on top of the opening 16 and positioned so as to allow air within the grain bin 10 to pass out through the opening 16. The ventilator 18 is essentially of the type shown in U.S. Pat. No. 3,041,956, although, other types of wind-powered turbine ventilators are adequate for the purpose of this invention. Further, in some instances it is conceivable that a fan device (not shown) may be mounted near the opening 16 in place of the ventilator 18.

A damper mechanism 20 is connected to an intake plenum chamber 22 through a tube 24 attached to the sidewall 12 of the bin 10. It is noted that the damper mechanism 20 is essentially of the type disclosed in U.S. Pat. No. 3,426,445 to Steffen. A fan 26, preferably electrically operated, is disposed within the tube 24 and, when operating, forces outside ambient air into the lower plenum 22. As illustrated by air circulation lines 28, the air then passes up through an air pervious floor 30, through grain 32, to an exhaust plenum 34 and out through the opening 16 and the turbine ventilator 18. When the fan 26 is not circulating air through the grain 32, the damper mechanism 20 prevents air from entering the bin at the intake plenum 22.

Figure 2:
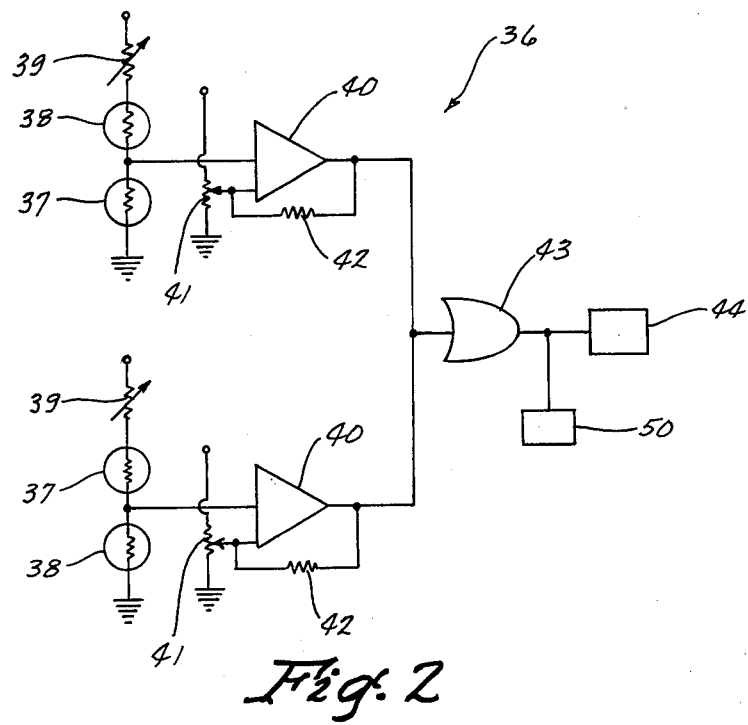
FIG. 2 is a schematic diagram of the temperature sensing, comparator and activating circuit.

The fan 26 is controlled by a control circuit 37 as shown in FIG. 2. The control circuit 36 includes a grain temperature sensor unit comprised of thermistors 37, an atmospheric air temperature sensor unit comprised of thermistors 38, an variable resistors 39. Between each of the thermistors 37 and 38, a connection is made going to one of the input terminals of comparators 40. Each comparator 40 is connected at its other input terminal to a variable resistor 41. The resistor 41 has one end connected to the ground and the other end connected to a voltage supply. Also, a feed back resistor 42 is connected between the output of the comparator 40 and the input lead from the resistor 41. Both outputs from the comparators 40 are then fed into an OR gate 43. The output of the OR gate 43 may then be fed to an activating circuit 44 which, in turn, will activate the fan motor 46. The activating circuit 44 may, in some instances, be a simple relay switching device, or in other instances, may be more advanced and complicated switching network, such as the types disclosed in co-pending U.S. patent application Ser. No. 615,422, filed Oct. 24, 1975 incorporated herein by reference. If the type of switching circuit disclosed in patent application Ser. No. 615,422 is used, it is comtemplated that the output of the OR gate 43 of this invention will be fed directly into the resistor 72 as illustrated in the drawings of this patent application. The control circuit 36 which includes elements 37–43 are preferably housed in a weather proof box 35 as illustrated in FIG. 1.

In the preferred embodiment of the control circuit 36, the thermistors 37 and 38, along with the variable resistor 39, form a first voltage dividing network. The variable resistor 41 forms part of a second voltage dividing network such that when the air temperatue and grain temperature are within the allowable temperature differential, the input signals being fed into the comparator 40 will be balanced. When the temperature differential between the air and the grain are not within the allowable range, then the input to the comparator 40 will no longer be balanced; and, if the signal level from the thermistors 37 and 38 is above that of the variable resistor 41, the comparator 40 will produce an output.

The thermistors 37 and 38 may be of the type disclosed in the above mentioned patent application and are commercially available. The variable resistors 39 may be conventional variable resistors or they may include the resistor ladder network as disclosed at number 25 in the above mentioned patent application. The purpose of variable resistors 39 is merely to provide means for sensing a temperature differential between the inside grain temperature and the ambient air temperature. The comparators 40 are operational amplifiers, the OR gate 43 is commercially available from electrical equipment suppliers and functions as a typical OR gate. The resistors 41 are variable resistors through which a controllable input is fed into the comparators 40. The resistor 42 serves as a feed back resistor to control the output of the comparators 40. It should be mentioned that the power supply in the above mentioned patent application is suitable for operating the circuit since this supply adequately supplies the isolation between the low voltage tightly regulated supply for the integrated circuits and the high voltage-high current supply going to the fan motor 46.

During the operation of the circuit 36, when the outside air temperature moves into a region below the grain temperature minus the temperature differential, the voltage drop across resistor 39 and the thermistor 38 will not balance the other input to the comparator 40 and will cause the comparator 40 to produce high level output signal going to the OR gate 43. This will cause the OR gate 43 to produce a high level logic signal which will in turn energize the activating circuit 44 which will then turn on the fan motor 46. When the temperature differential between the outside air and the grain falls within the allowable range, the two inputs to the comparator 40 will then be balanced thus causing it to terminate at its output signal to the OR gate 43. When this occurs, the OR gate 43 will not produce an output signal and the remainder of the circuit will no longer be energized. When the outside air temperature moves to a level above the grain temperature and above the temperature differential which is allowable as determined by variable resistors 39, the voltage drop across the variable resistor 39 and the thermistor 37 on the bottom portion of the circuit will no longer balance the input to the bottom comparator 40 and will cause it to produce an output which is fed to the OR gate 43. When this occurs, the OR gate 43 will energize the remainder of the circuit and cause the fan motor 46 to be turned on. As the grain temperature rises to be within the allowable temperature differential between the outside air and the grain, the inputs to the comparators 40 will again be balanced and the comparator 40 will no longer produce an output. When this occurs, the OR gate 43 will not receive a high level signal, thus the remainder of the circuit will no longer be energized and the fan motor 46 will be turned off.

The moisture equilibrium between the grain 32 and the atmospheric air is indirectly maintained as the fan 26 circulates the air through the grain 32. If the moisture content of the grain 32 is more than that of the air, the air, by circulating through the grain 32, will evaporate moisture from the grain 32 until a moisture equilibrium is established. If the air circulating through the grain 32 has a higher moisture content than the grain 32, the grain 32 will absorb moisture from the circulating air until the equilibrium is established.

The preferred embodiment of the invention is adapted for the storage of corn, however, the teachings of the invention would be equally applicable to other types of grain. It has been determined that the optimum conditions for corn occurs when the grain temperature is within two degrees of the ambient air temperature.

Therefore, the control apparatus 36 senses the ambient air temperature and the grain temperature and as long as these two temperatures are within ± 2° F. of each other, the grain condition is considered to be essentially in equilibrium with the present atmospheric air condition. Whenever the differential temperature between the grain and the air is greater than ± 2° F., the control apparatus 36 will respond and activate the fan motor 46.

The control device herein described pertains to controlling the ventilation equipment and is designed to activate the ventilation equipment any time an extreme difference in temperature occurs between the grain and its environment, whether atmospheric air is colder than the grain temperature or warmer than the grain temperature.

Thereby, regardless of temperature fluctuations that occur from day to day, the system automatically brings the grain condition into an equilibrium with the current atmospheric conditions.

The application of this method is especially important in preserving grain for maximum value over long-range storage after it has been cured. Heat of respiration can be utilized to help in the removal of respiration-moisture. As the grain is ventilated, respiration-heat will be expended in energizing the evaporation of moisture; thus, as long as there is moisture present to be evaporated, the sufficient heat-evergy to effect its removal, drying will take place. The amount of heat expended in the drying process can be measured in the exhaust-air coming from the grain. So long as the exhaust-air temperature is colder than in-going temperature (atmospheric), removal of heat and moisture is taking place.

When the seasons is changing, (springtime, for example, coming from cold weather to warmer weather), atmospheric temperatures will be warmer than grain temperatures, and the equilibrium grain temperature will be higher while the equilibrium moisture content will be lower. For economic reasons, it is desirable to prevent excess drying of grain, for the weight of moisture in grain determines bushels, thus income, as does weight of dry matter. Once the grain moisture is brought to the 14-15% level, minimal ventilation is required to prevent heating through the summer months. Therefore, a high temperature cut-out device 50 is included within the control apparatus 36 to override the control apparatus 36 whenever the atmospheric air temperature reaches a certain level. The temperature cut-out device 50 may be a simple thermostatic switch of the typical bi-metal type.

The cut-out device 50, as shown in FIG. 2, is connected between the comparator circuit 36 and activating circuit 44. When the temperature activates the device 50, an open circuit will occur between circuits 36 and 44, thereby preventing the activating circuit 44 from receiving the signal from the OR gate 43, then not switching on the fan motor 46. When the grain being stored is corn, it is contemplated that under normal circumstances the temperature cut-out device 50 would be set at approximately 60° F. Therefore, during late spring, summer and early fall, manual or thermostatic operation is desirable to prevent unnecessary removal of moisture, which would take place if the automatic ventilation equipment was employed.

On the other hand, going from summer to fall/winter, the equilibrium temperature of grain decreases while the equilibrium moisture of grain increases. As is well known in the prior art, under a controlled condition, the increase of moisture in the seed may promote increased hydrolysis, i.e., conversion of water to dry matter, thus increasing the weight and value of the grain without necessarily increasing the rate of respiration.

Obviously, many modifications and variations of the present invention are possible in light of the above teachings. It is therefore to be understood that, within the scope of the appended claims, the invention may be practiced otherwise than as specifically described.

I claim:

1. A method for storing seed grains in a grain bin having air impervious sidewalls, a roof, a grain storage chamber, means within said grain storage chamber for sensing the temperature of grain within said grain storage chamber, plenum chambers disposed on opposite sides of said grain storage chamber, one of said plenum chambers being an intake and the other an exhaust, said plenum chambers having air pervious means where the plenum chambers are in communication with the grain storage chamber, means for sensing the temperatue of atmospheric air, fan means attached to said grain bin for selectively supplying atmospheric air to the intake plenum chamber, an exhaust means in the grain bin in communication with the exhaust plenum chamber, said method comprising:

activating said fan means when the temperature differential between the atmospheric air and the stored grain exceeds a predetermined amount; and, deactivating said fan means when the temperature differential between the atmospheric air and the stored grain is less than or equal to said predetermined amount.

2. The method of claim 1 wherein said grain is corn and the predetermined amount is approximately 2° F.

3. The method of claim 1 further including preventing the operation of the fan means when the ambient air temperature exceeds a predetermined temperature level.

4. The method of claim 3 wherein said grain is corn and said predetermined temperature is approximately 60° F.

5. The method of claim 3 further comprising;

preventing the passage of atmospheric air into the intake plenum chamber through the fan means when the fan means is not in operation.

6. An apparatus for storing seed grains including a grain bin having air impervious sidewalls, a roof, a grain storage chamber, means within said grain storage chamber for sensing the temperature of grain stored within said grain storage chamber, plenum chambers disposed in opposite sides of said grain storage chamber, one of said plenum chambers being an intake and the other an exhaust, said plenum chambers having air pervious means where the plenum chambers are in communication with the grain storage chamber, means for sensing the temperature of atmospheric air, fan means attached to said grain bin for selectively supplying atmospheric air to the intake plenum chamber, and an exhaust means in the grain bin in communication with the exhaust plenum chamber, the improvement comprising;
- means for activating said fan means when the temperature differential between the atmospheric air and the stored grain exceeds a predetermined amount; and,
- means for deactivating said fan mans when the temperature differential between the atmospheric air and the stored grain is less than or equal to said predetermined amount.

7. The apparatus of claim 6 further comprising;
means for varying said predetermined amount.

8. The apparatus of claim 6 further comprising;
means for preventing the operation of the fan means when the atmospheric air temperature exceeds a predetermined temperature.

9. The apparatus of claim 8 comprising;
means for varying said predetermined temperature.

10. The apparatus of claim 8 further comprising;
a thermostatic control which is connected to and controls the operation of said fan means.

11. The apparatus of claim 8 further comprising;
means for preventing the passage of atmospheric air into the intake plenum chamber through the fan means when the fan means is not in operation.

12. The apparatus of claim 11 wherein said means is a damper mechanism.

13. The apparatus of claim 6 wherein said activating and deactivating means include:
- first means for sensing the temperature of the atmospheric air,
- second means for sensing the temperature of the stored grain,
- third means for providing electrically said predetermined amount, and
- means for comparing said first, second, and third means and controlling said fan means.

14. The apparatus of claim 13 wherein said first and third means form one leg and said second means forms a second leg of a first voltage divider, said first voltage divider is one input to a first comparator, said second and third means form one leg and said first means forms a second leg of a second voltage divider, said second voltage divider is one input to a second comparator, a reference signal is the other input to both of said comparators, a control means responsive to an output from either comparator for activating said fan means.

15. The apparatus of claim 15 including a means responsive to the atmospheric air temperature for disconnecting said comparators and said control means when said atmospheric air temperature exceeds a predetermined value.

* * * * *